United States Patent

Braeuer et al.

Patent Number: 6,094,319
Date of Patent: Jul. 25, 2000

[54] METHOD AND APPARATUS FOR TRACKING A HELICAL TRACK RECORDING

[75] Inventors: Dietmar Braeuer; Juergen Kaaden; Gerhard Reiner, all of Villingen-Schwenningen, Germany

[73] Assignee: Deutsche Thomson-Brandt GmbH, Villingen-Schwenningen, Germany

[21] Appl. No.: 08/945,613

[22] PCT Filed: Apr. 19, 1996

[86] PCT No.: PCT/EP96/01632

§ 371 Date: Dec. 11, 1997

§ 102(e) Date: Dec. 11, 1997

[87] PCT Pub. No.: WO96/34385

PCT Pub. Date: Oct. 31, 1996

[30] Foreign Application Priority Data

Apr. 28, 1995 [DE] Germany .......................... 195 15 074
Sep. 28, 1995 [DE] Germany .......................... 195 35 226

[51] Int. Cl.[7] .............................. G11B 15/14; G11B 5/58
[52] U.S. Cl. ............................................ 360/64; 360/77.15
[58] Field of Search ........................... 360/64, 48, 77.14, 360/77.15

[56] References Cited

U.S. PATENT DOCUMENTS 4,237,500  12/1980  Sanderson ............................ 360/77
4,890,173  12/1989  Yokozawa ......................... 360/77.15
4,943,873   7/1990  Kawasaki ......................... 360/77.15

FOREIGN PATENT DOCUMENTS 0 359 019   3/1990  European Pat. Off. .
0 618 567   5/1994  European Pat. Off. .
0 630 010  12/1994  European Pat. Off. .
0 646 915   4/1995  European Pat. Off. .
8007408     1/1996  Japan .
96/34385   10/1996  WIPO .

OTHER PUBLICATIONS

Rijckaert, et al., "An Experimental Digital Consumer HDTV Recorder Using MC–DCT Video Compression", Nov. 1993, pp. 711–721.

Primary Examiner—W. Chris Kim
Attorney, Agent, or Firm—Joseph S. Tripoli; Josep J. Laks; Francis A. Davenport

[57] ABSTRACT

It is known in the case of digital helical track recording and replay apparatuses for audio, video and general data to be recorded for pilot tones to be interleaved in the data tracks, for tracking. The interleaving can be carried out simultaneously with the data by frequency decoupling (a) or by superimposition (b). The invention is based on the object of providing a helical track recording and replay system which carries out tracking in a simple manner. According to the invention, the ATF signal is obtained in a filter module, which also carries out the rectification of the filtered-out pilot tones. The two DC voltage levels are interrogated and processed in the servo microcontroller, with A/D converters. Coupled to the rotation of the head drum, pulses are produced by the servo system which switch the ATF conditioning over between direct operation and tracking operation, so that evaluation is achieved by the microcontroller during the fast ATF burst phase.

3 Claims, 9 Drawing Sheets

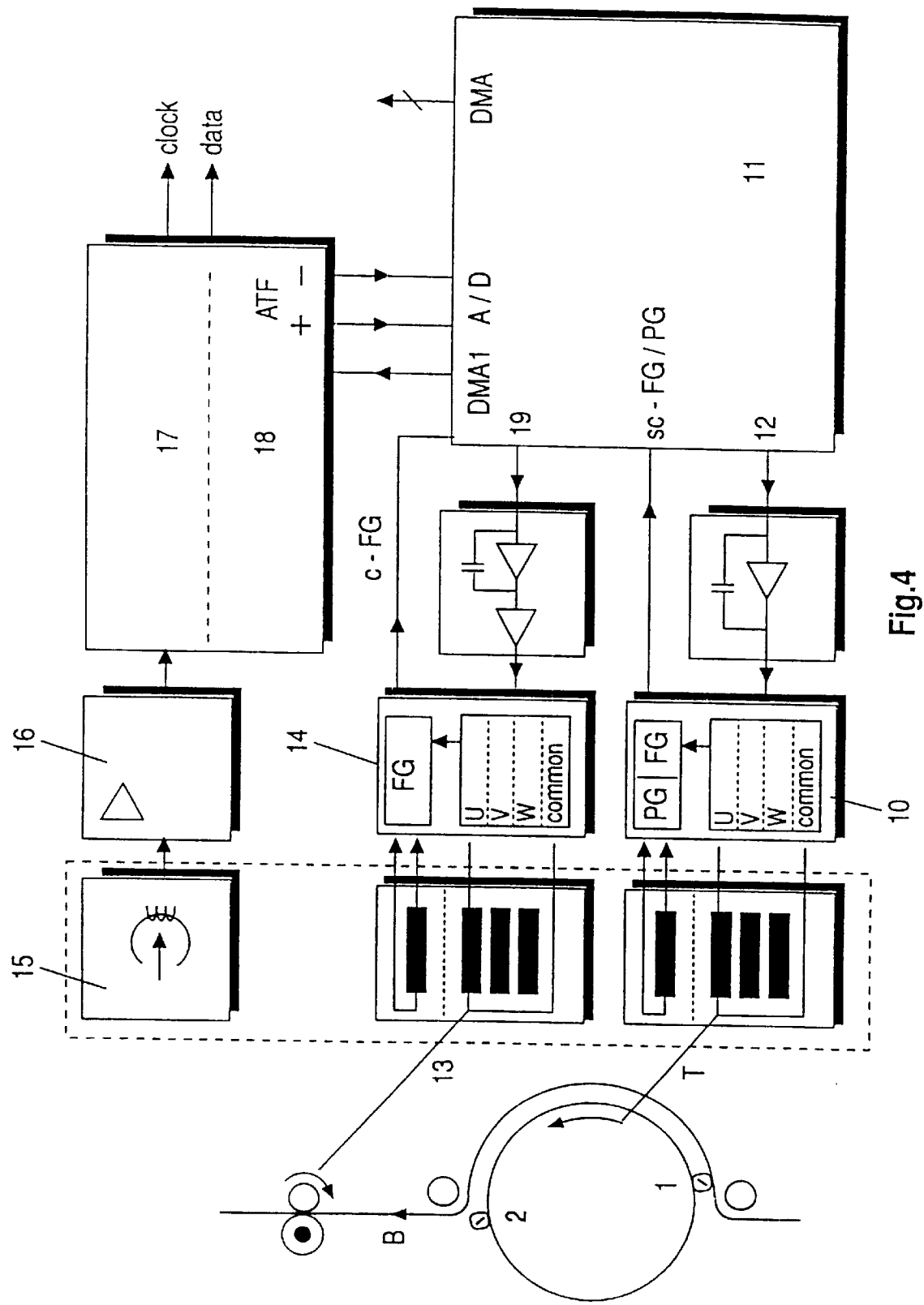

METHOD AND APPARATUS FOR TRACKING A HELICAL TRACK RECORDING

This application is a 371 of PCT/EP96/01632, filed Apr. 19, 1996.

The invention is based on a helical track recording and replay apparatus for data.

It is known in the case of digital helical track recording and replay apparatuses for audio, video and general data to be recorded for pilot tones to be interleaved in the data tracks, for tracking. The interleaving can be carried out simultaneously with the data by frequency decoupling (a) or by superimposition (b).

The entire track length is advantageously available for evaluation in such cases. In case (a), the necessary limitation of the data channel bandwidth and the precise maintenance of the pilot carrier amplitudes in order to avoid interference from harmonics are disadvantageous. In case (b), the small amplitude is disadvantageous since use is made of a method of digital sum variation in time with the pilot carrier frequency, which allows only a low level of pilot carrier energy. The interleaving of the pilot tones can be carried out using time-division multiplex (burst ATF). Since no data are transmitted at the same time, the energy in the pilot frequencies is very high. The time duration for pilot tone keying, which time duration is reduced to the necessary settling time of the evaluation filters, is disadvantageous.

The systems according to (a) and (b) are prior art and are sufficiently known. Solutions using separate ICs for Digital Audio Tape DAT are known in the case of burst ATF combined with a digital servo system on a microcontroller basis. The pilot carrier signal is filtered and rectified in these ICs, and a track error signal is produced from the crosstalk signals. This is added as a phase correction signal to the control signal, which is provided by the servo system, for the tape feed. Such a solution is expensive and extremely inflexible if, for example, various tape feed operating modes are desired which are all intended to be carried out on a phase-synchronized basis using various rules.

The invention is based on the object of providing a helical track recording and replay system which carries out tracking in a simple manner. This object is achieved by the features of the invention specified in claim 1. Advantageous developments are specified by the subclaims.

In the case of the solution according to the invention, the processing of the ATF information (including the burst ATF) for the DVC (Digital Video Cassette) format is included in a microcontroller system, so that all the correction signals are processed by this system and the corresponding motor control signals are provided as a function of the operating modes. The area of the embedded ATF is in this case used for tracking in normal replay operation, while the burst ATF area is used during overwriting operation and during search replay of recorded data in order to find predetermined track elements, for example MPEG data.

According to the invention, the ATF signal is obtained in a filter module, which also carries out the rectification of the filtered-out pilot tones. The two DC voltage levels are interrogated and processed in the servo microcontroller, with A/D converters. Coupled to the rotation of the head drum, pulses are produced by the servo system which switch the ATF conditioning over between direct operation and tracking operation, so that evaluation is achieved by the microcontroller during the fast ATF burst phase.

According to the invention, the digital magnetic tape recording apparatus for tracking signals, some of which have a short duration, is fitted with a head drum, a tape drive mechanism, a head amplifier, a servo control system and tracking signal processing having filter stages and rectifiers.

The tracking signal processing will retain the previous value for the duration of a track pulse emitted by the servo control system, during time intervals which are dependent on the operating mode. The track pulse is derived from the head drum rotation. The tracking state is used to mask out interference and to evaluate signals of short time duration with respect to the overall evaluation duration.

The position and length of the track pulse are dependent on the operating mode, are determined from the head drum position and are varied by the servo and microcontroller. The crosstalk components are evaluated in normal operation and in overwriting operation as the criterion for tracking. The position of the tracking signals, some of which have a short duration, is evaluated during search reproduction relative to the head drum rotation, for tracking. The pilot signal which is read directly from the track is evaluated for this purpose, rather than the crosstalk components.

The invention is explained in the following text with reference to the drawings, in which:

FIG. 4 shows a block diagram using the solution according to the invention,

Figure 5A:
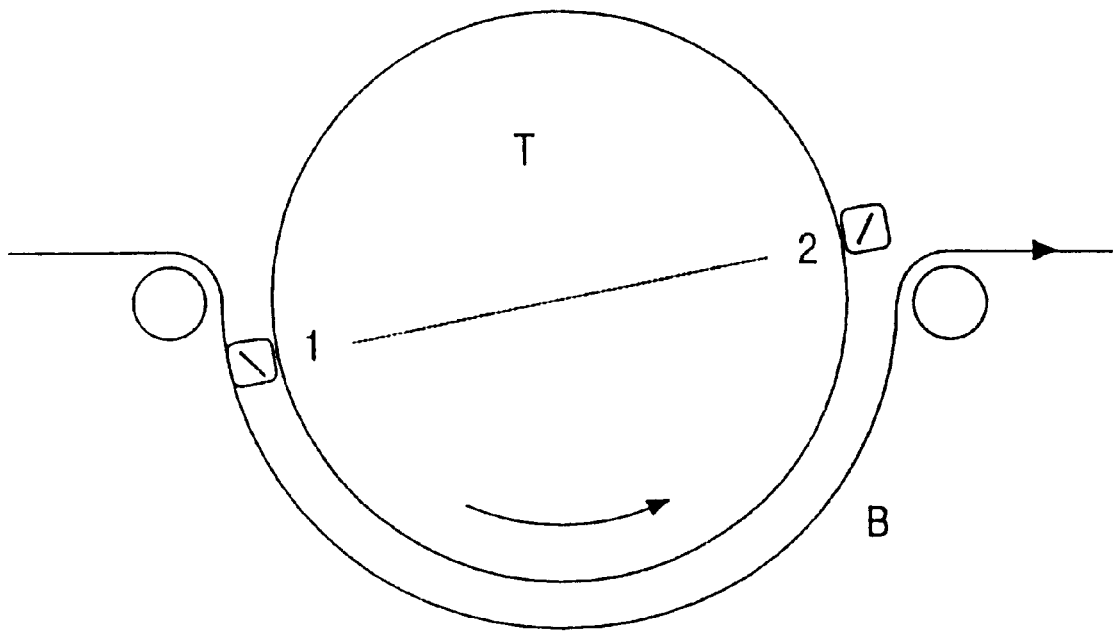
FIG. 5a shows a head drum.

The DVC system is based on helical track recording. FIG. 5a shows the necessary head drum T, and the read/write heads 1/2 are also shown. In the case illustrated, they dip into the tape B successively.

Figure 5B:
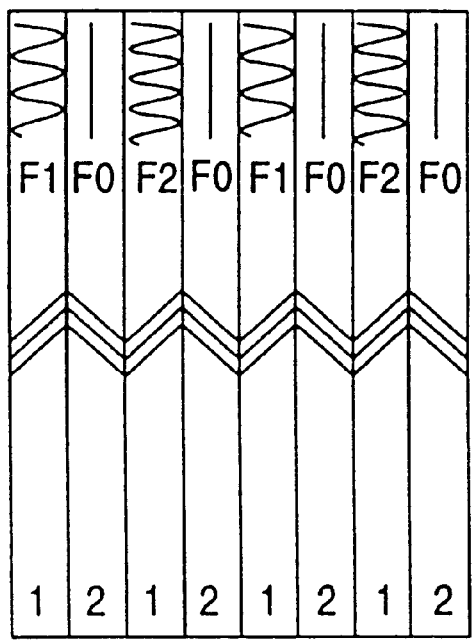
FIG. 5b shows a pilot layout.

The layout of the tracking frequencies and of the resulting tracks is illustrated in simplified form in FIG. 5b. The heads 1/2 are in this case at different azimuth angles, the crosstalk signal suppression being small at low frequencies. The low-frequency tracking frequencies F1,F2 are changed from one revolution to the next revolution during the recording for one head, and a signal F0 is produced for the other head, which signal suppresses the F1 and F2 components contained in the video signal, audio signal and data signal which is generally to be recorded. The F0 tracks thus have no pilot carrier. In the case of the illustrated example, head 2 is used for evaluation during replay. Thus: the head 2 (and, because of the fixed geometric coupling on the head drum, head 1 as well) is following the track in an optimum manner provided the crosstalk components F1/F2 from the adjacent tracks have the same amplitude.

Figure 2:
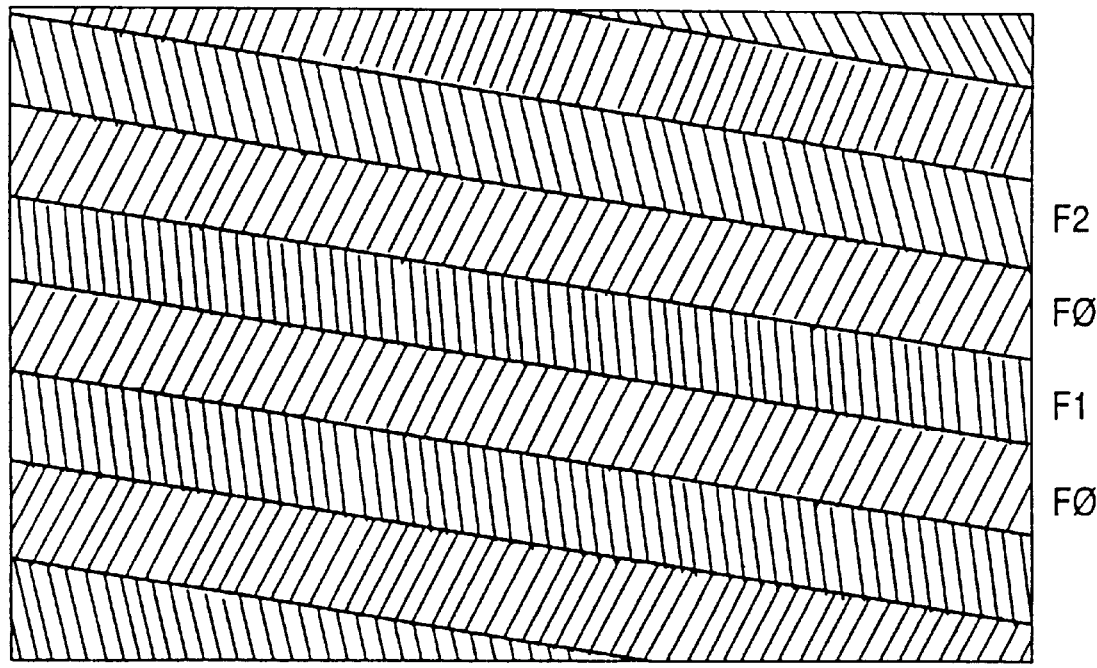
FIG. 2 shows a DVC track illustration.

The tracking signals which are used for tracking and are recorded on the tape can be seen in the lower part of the illustration in FIG. 2. A magnetized piece of tape of a DVC recording which is coated with bitter liquid reflects the light in a manner corresponding to the tape magnetization. The illustration shows track start areas in which the low-frequency ATF structures F0,F1,F2 are particularly easily visible as a result of the high-energy burst recording. Data areas outside the burst ATF section can be seen in the upper area of the illustration.

Figure 1:
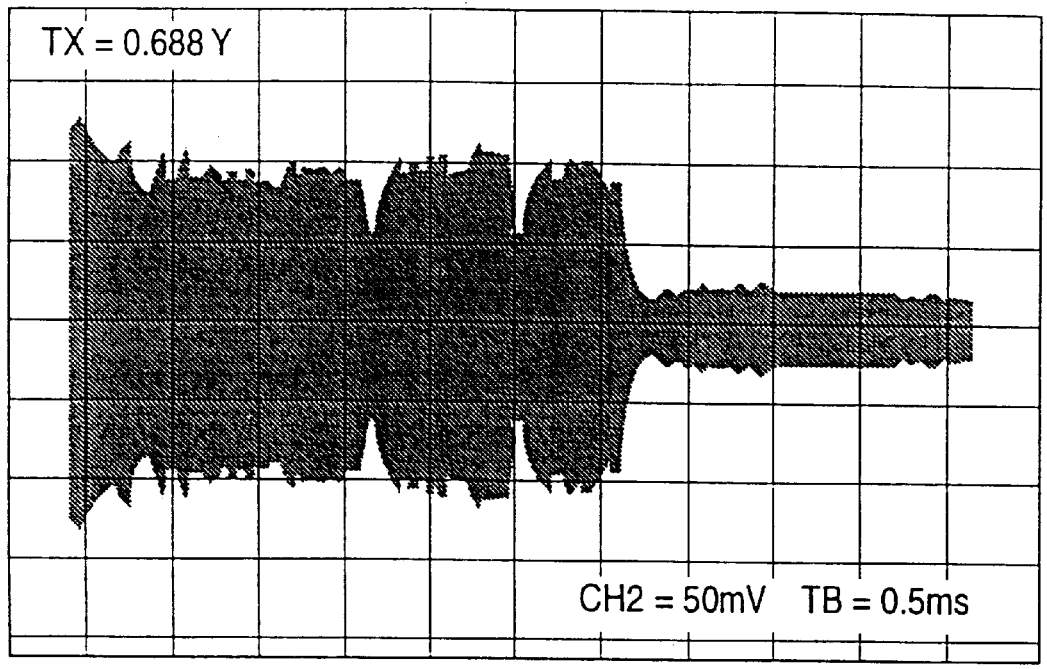
FIG. 1 shows the signal at the filter output.

FIG. 1 illustrates the signal which is separated at the filter output of the selection stage for the pilot tone F1 and has been read by the head 2 after appropriate amplification. The higher burst ATF amplitude can clearly be seen, but the short time interval in which the evaluation must take place is also visible.

Figure 3:
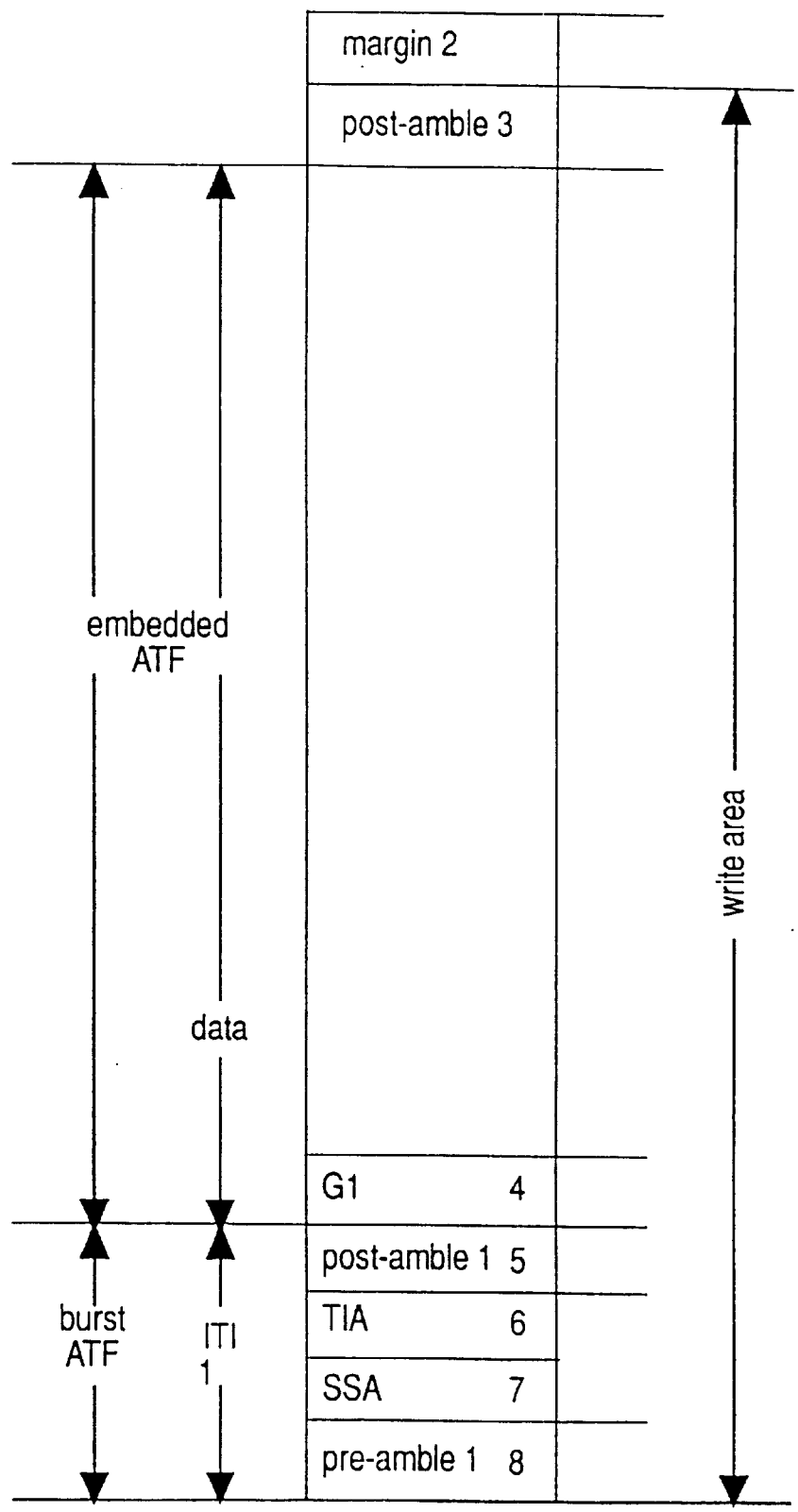
FIG. 3 shows a DVC recording area.

FIG. 3 illustrates the areas in the track format which are defined in the DVC standard, burst ATF and embedded ATF alternating within an active write area of a track. An already written burst ATF area is no longer erased, and new sections (inserts) are only inserted behind it.

The ITI area (Insert and Track Information) contains the burst ATF section and important information for the subsequent track organization. The area 2 (margin) does not contain any relevant data and represents a safety area. The area 3 (post-amble) marks the end of the recording section in use. The area 4 (G1=Gap1) is an editing gap. During overwriting, the write amplifier is switched on in this area (servo tolerance compensation). The post-amble (area 5) marks the end of the ITI area, and the pre-amble (area 8) announces it. The area 6 (TIA=Track Information Area) contains track numbers and subsequent track organization as well as the information about the recording tape feed speed. The area 7 (SSA=Start Sync-block Area) is used for finding the track position, for synchronization of the channel electronics and for preparation for the TIA section.

FIG. 4 illustrates the block diagram of the system according to the invention. The head drum T with the heads 1 and 2 is driven by the scanner driver 10 which receives its input information from the servo microcontroller 11 via sc control 12. Information about the speed and phase of the motor is passed to the microcontroller on a combined signal line sc-FG/PG.

The tape is driven forwards via the capstan 13, which is driven by the capstan driver 14 which, in turn, receives its input information from the servo micro-controller 11 through the output C-control 19. The information about the present tape feed speed is obtained directly on the circumference of the motor via a magnetic tacho whose pick-up coil 20 is illustrated above the threewinding motor coil assembly and is connected to the servo microcontroller 11 via the line c-FG.

The ATF signal for phase control of the tape feed is obtained from the replay signal, which is read from the tape by the head and is amplified. The ATF processing 12 makes the pilot tone signals ATF+/− available at analogue to digital converter inputs of the servo microcontroller. The ATF tracking state is triggered via the line DMA 1, and the signals DMA control the changeover processes at the head amplifiers.

The position and length of the DMA/DMA1 signals are determined from the head drum position by the servo microcontroller, and are changed, depending on the operating mode. Also illustrated are the replay head 15, the replay head amplifier 16, the equalizer unit, PLL and detection 17 with the clock and data outputs.

Figure 6:
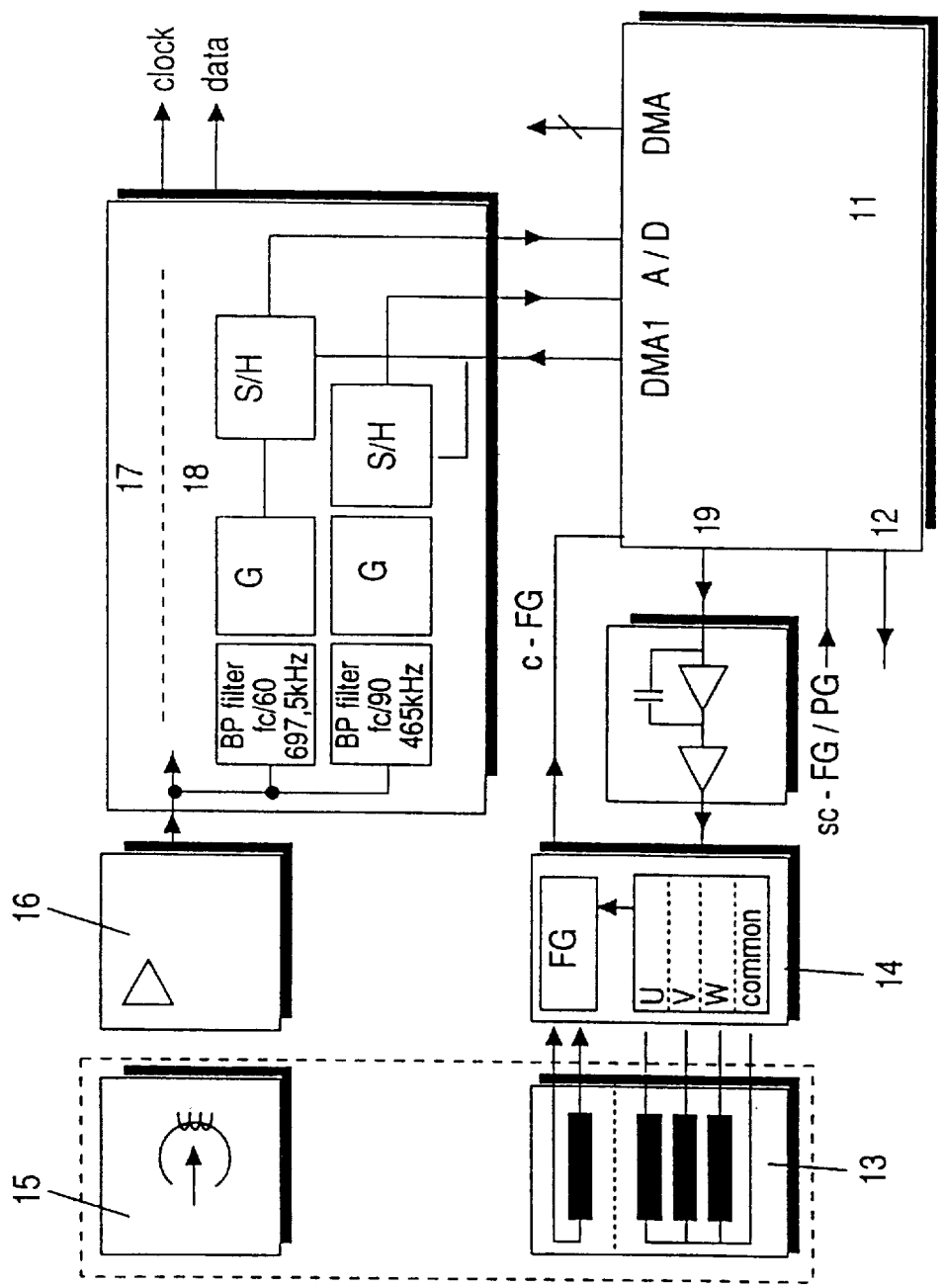
FIG. 6 shows a block diagram of the ATF process.

FIG. 6 shows the relevant assemblies for tape feed speed control using ATF. The ATF signal processing 18 has the filters for the pilot tones, the nominal frequency levels being specified, although these can be varied in special operating modes. A signal according to FIG. 1 can be measured at the output of the filters. Sample and hold stages S/H, whose output signals are directly processed by the servo microcontroller 11 as tracking information for phase control of the tape feed, are connected to the outputs of the rectifier stages G. The assemblies illustrated in FIG. 4 are also illustrated.

Figure 7:
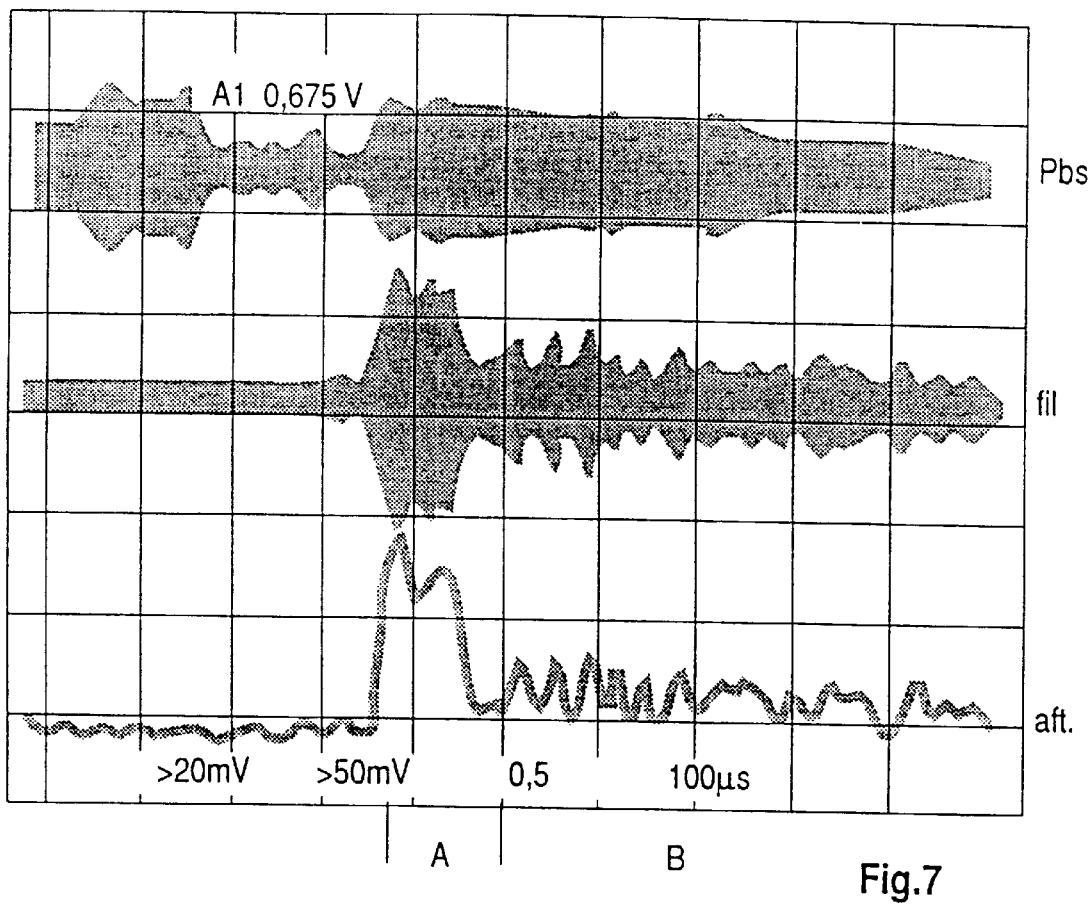
FIG. 7 shows an oscilloscope display of the evaluation voltages.

The evaluation voltage of a pilot tone filter for the replay state is illustrated in FIG. 7. The illustrated signals are the replay amplifier signal Pbs, the filtered-out signal fil at 697.5 kHz and the conditioned signal aft. The increase in amplitude during the burst ATF Phase A can clearly be seen. Embedded ATF B or burst ATF A may optionally be evaluated in this operating mode, the crosstalk of the adjacent tracks being used.

Figure 8:
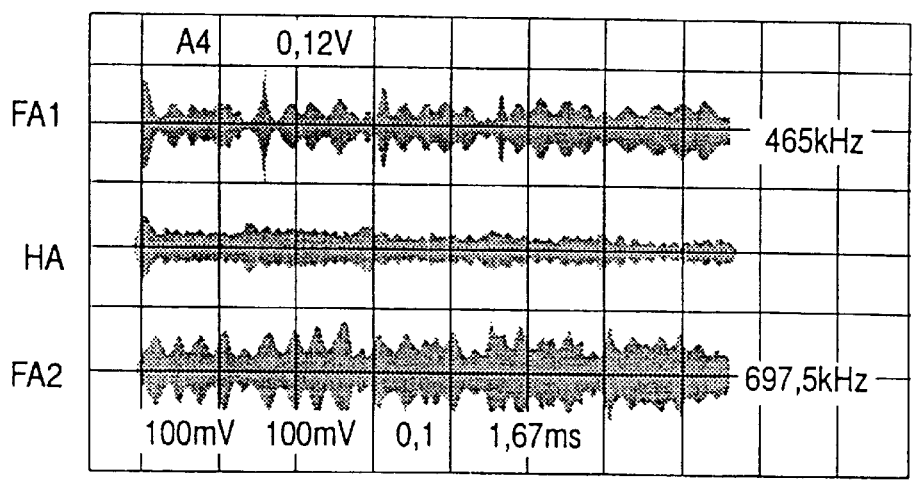
FIG. 8 shows an oscilloscope display of the filter outputs.

FIG. 8 illustrates the signals at the filter outputs for search speed. The illustrated signals are the filter output FA1 at 465 kHz, the head amplifier output HA and the filter output FA2 at 697.5 kHz. Only the burst ATF pulse from the main track is evaluated in this operating mode.

In a development of the invention, phase synchronization between the head drum servo system and the tape feed servo system is carried out, in which the position of the read burst ATF information, related to the head switching signal, is used as a measurement variable for the phase error. A dedicated required value is in this case specified for each search speed.

The detection of the burst ATF sections is carried out by amplitude comparison with the mean value of the embedded ATF information. A threshold value detector, which can be set by the servo system, is provided for this purpose.

The filters are slaved, the clock which is obtained in a PLL from the data being available as the control variable, or the servo system predetermining the control information and a reference clock being used.

During search replay, phase synchronization is carried out between the read head position and the tape feed drive, the timing of a predetermined level difference in the output signal of the tracking signal processing with respect to the position of the head switching signal being used as measurement information.

The actual value for the phase error can be varied at each search speed. The tracking signal of one pilot carrier frequency is evaluated. The tracking signal of both pilot carrier frequencies is evaluated alternately. The changeover is carried out by means of a multiplexer which is controlled by the servo system.

The level difference between embedded ATF and burst ATF signals is determined by the servo control system. The amplitude reference value is changed during the changeover between the pilot carrier frequencies. The change in the mid-frequency of the bandpass filters for pilot tone frequency filtering is compensated for in the search operating modes.

The filters have a fixed reference and the mid-frequency is slaved in a defined manner via the servo system. The filters take their reference from the resynchronized data clock. The evaluation of the phase synchronization, head switching signal production and ATF is carried out by a microcontroller. The signal STXT (servo tone exceeds threshold) is passed to an edge-sensitive input of the microcontroller. The signals STHA (servo tone high amplitude) and STLA (servo tone low amplitude) are passed to level-sensitive inputs of the microcontroller. Low/high indicates only track deviations, that is to say a deviation from the track centre in one direction means an increase in STHA and a reduction in STLA. A deviation in the other direction means a reduction in STHA and an increase in STLA.

Figure 9:
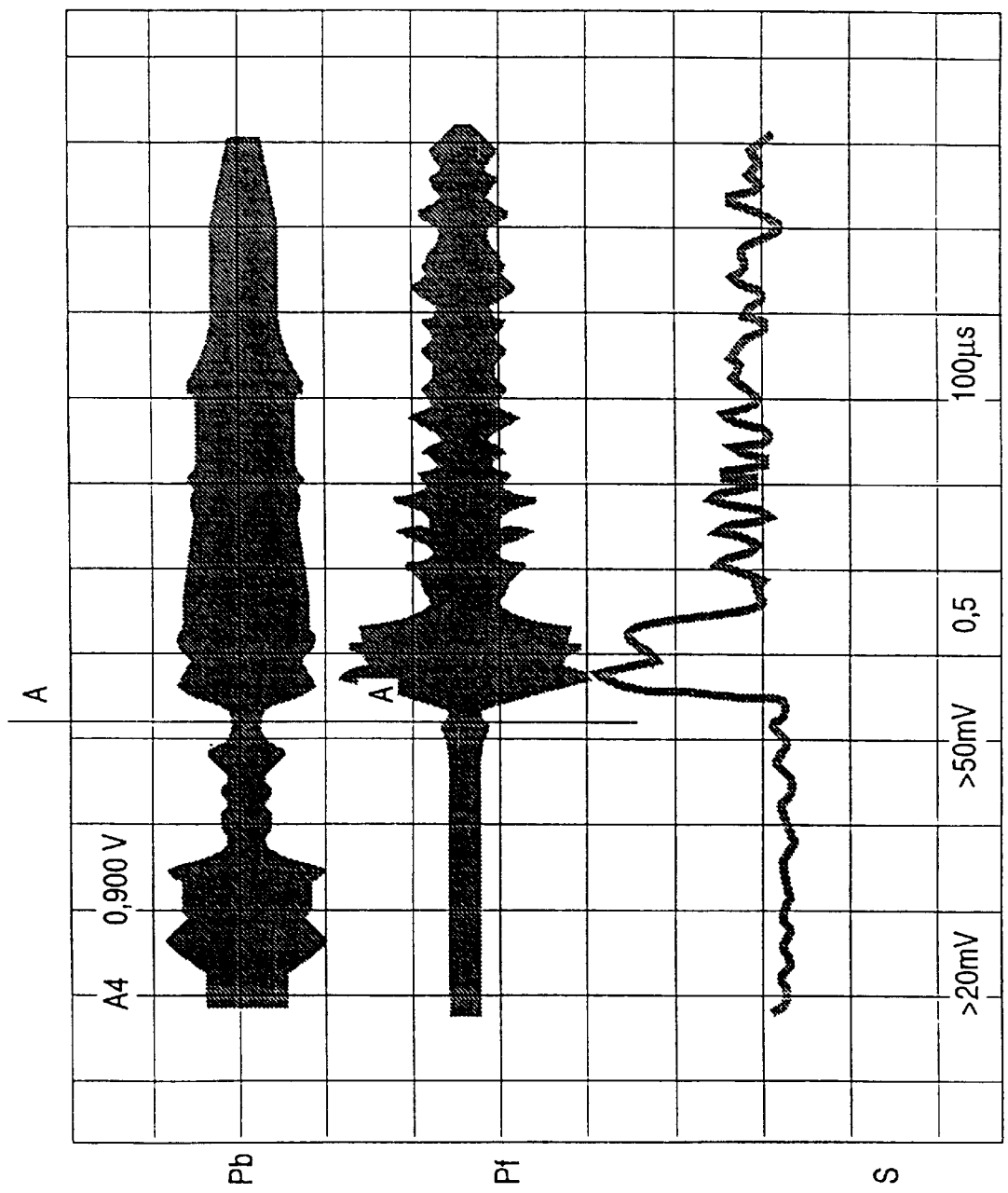
FIG. 9 shows an oscilloscope display of signals during reproduction.

FIG. 9 illustrates the replay signal Pb, which is separated at the output of the selection stage for the pilot tone frequency Pf 465 kHz, and the signal S which is available after peak value detection. The high burst ATF amplitude A can be seen at the start of the track.

Figure 10:
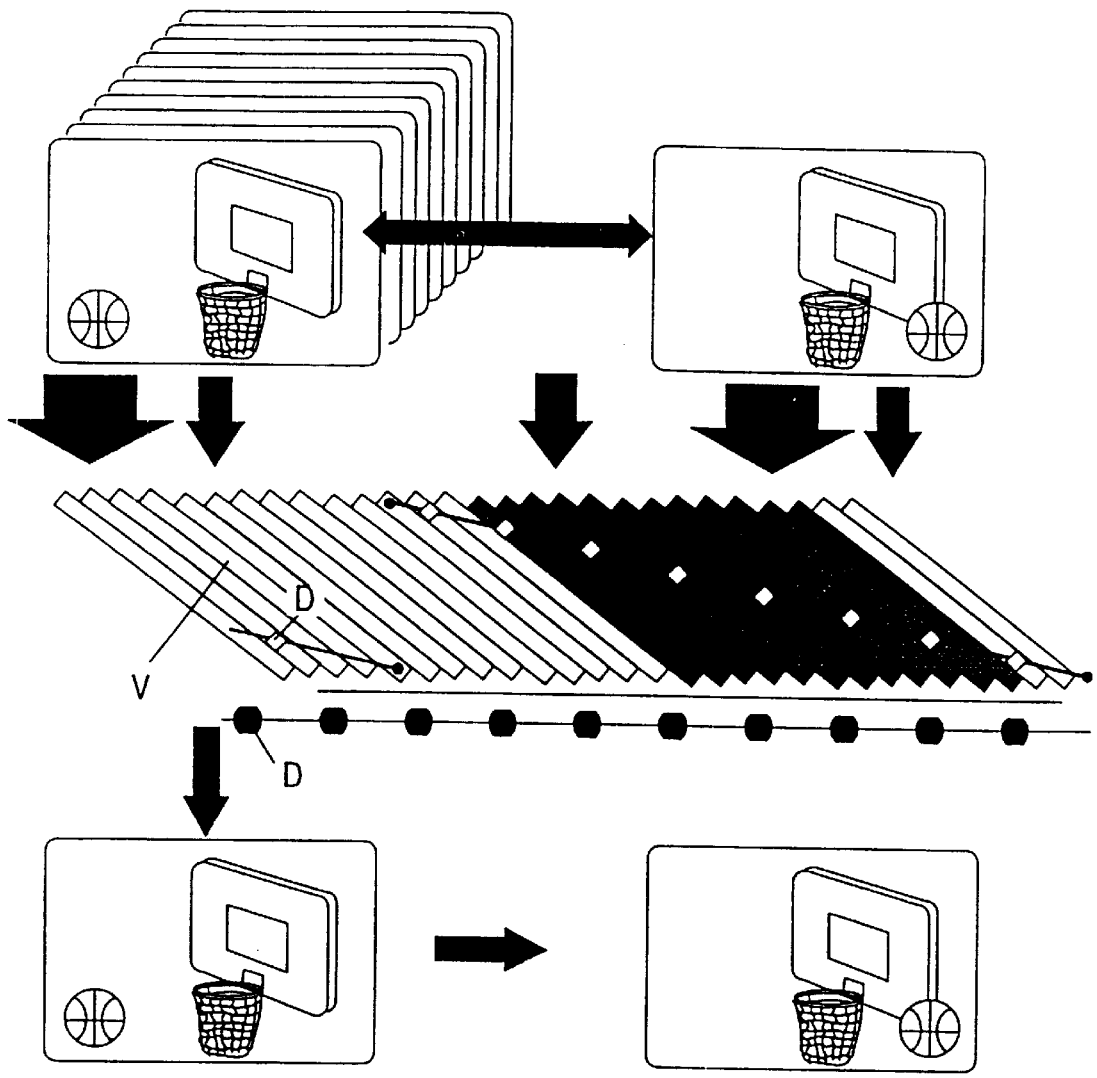
FIG. 10 illustrates the search information interleaving method used in the DVC standard for MPEG recording.

FIG. 10 illustrates the search information interleaving method used in the DVC standard for MPEG recording. In addition to each frame information item V, a data set D for search is interleaved in the recording tracks. For the best possible replay, the servo system must ensure that the points in the read phases are filled with relevant data information. Picture frequencies having low detailed resolution are formed in the MPEG decoder from the information which has been read completely.

Figure 11:
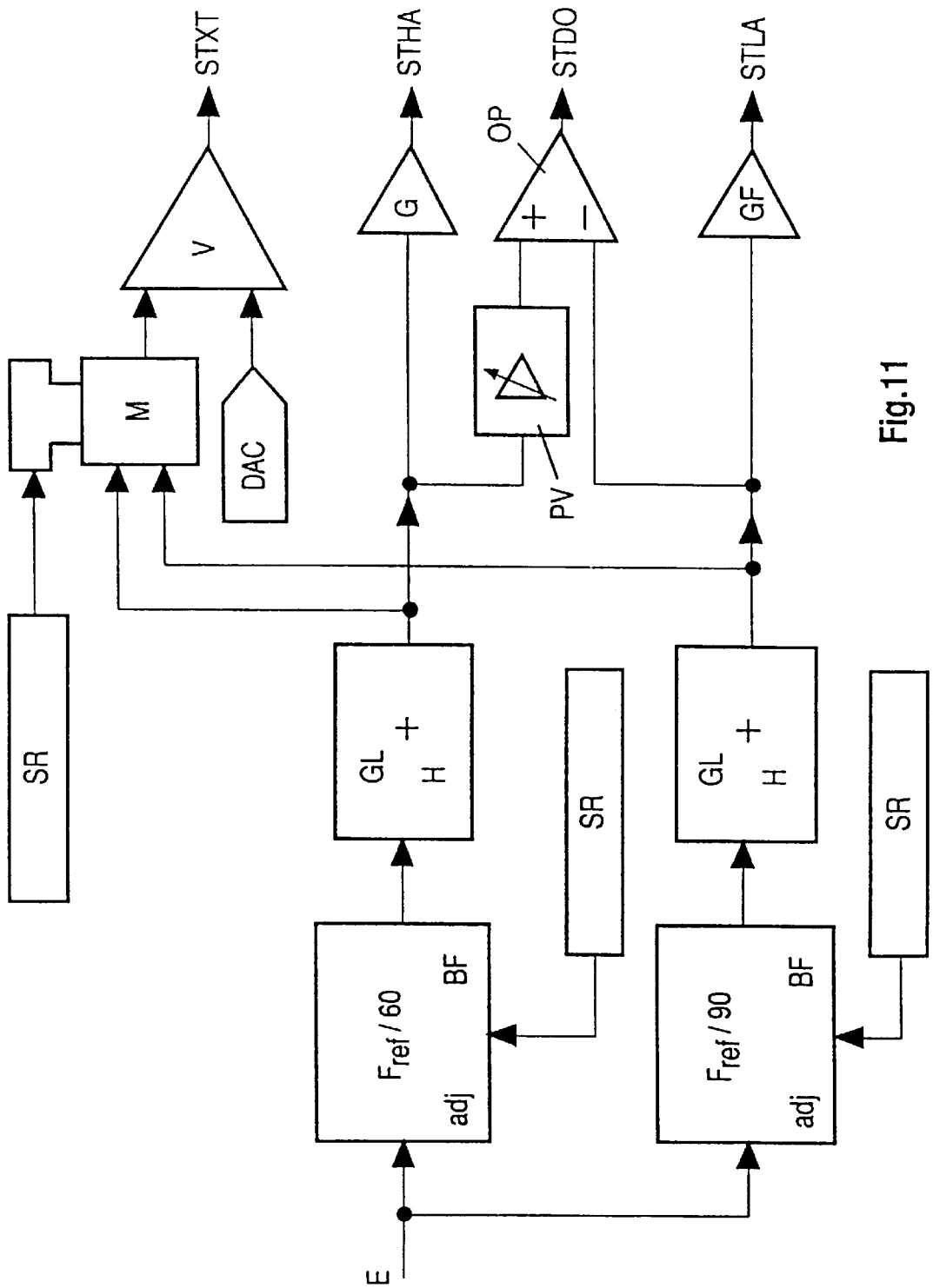
FIG. 11 illustrates the block diagram of the ATF filter solution according to the invention.

FIG. 11 illustrates the block diagram of the ATF filter solution according to the invention. The input signal E (sum pilot signal) is supplied to the bandpass filters BF. Downstream of said bandpass filters BF are the rectifier GL and the radio-frequency filter H. The ATF pilot tone amplitudes are available simultaneously at the outputs STHA and STLA. In addition, the ATF pilot signals are supplied to a comparator V, it being possible to make a selection with the aid of a multiplexer M as to which pilot carrier frequency is intended to be evaluated. A comparison amplitude is defined by the digital to analogue converter (DAC), which is controlled by the servo system, this comparison amplitude being the point at which the output STXT changes its level if said amplitude is exceeded or undershot. The bandpass filters BF are illustrated for a design with mid-frequency slaving via a serial register SR and internal digital to analogue converter. Also illustrated are a programmable amplifier PV and an operational amplifier OP at whose output the signal STDA is present.

We claim:

1. A method of tracking in a magnetic tape recorder with helical track recording, wherein tracking signals are recorded in addition to data payload signals, the frequency of the tracking signals alternates between a first and second frequency for successive helical tracks, and the tracking signals are recorded in a data payload area of the helical tracks with a first signal amplitude, and in a dedicated tracking signal region with a second amplitude greater than the first signal amplitude, said method comprising the steps of:

a) searching the helical tracks;

b) selecting the tracking signals selected in the one of the helical tracks being presently searched;

c) comparing an amplitude of the selected track signal to a predetermined value to determine when the dedicated tracking signal region of the selected helical track is being searched; and d) providing an output signal upon determining that the dedicated tracking signal region of the selected helical track is being searched.

2. The method according to claim 1, wherein said predetermined tracking signal amplitude used as an actual value corresponds to the mean value of the tracking signal amplitude determined during normal playback mode of the dedicated tracking signal region.

3. The method according to claim 1, wherein said method is used during playback of MPEG coded picture sequences wherein which have been interleaved extra data for high speed search mode in a DVC (digital video cassette) recorder.

* * * * *